Feb. 19, 1957 W. P. MERRILL 2,781,775
LIMITED CAPACITY CHECK VALVE
Filed Sept. 1, 1950 3 Sheets-Sheet 1

INVENTOR
Wesley P. Merrill

Feb. 19, 1957 W. P. MERRILL 2,781,775
LIMITED CAPACITY CHECK VALVE
Filed Sept. 1, 1950 3 Sheets-Sheet 2
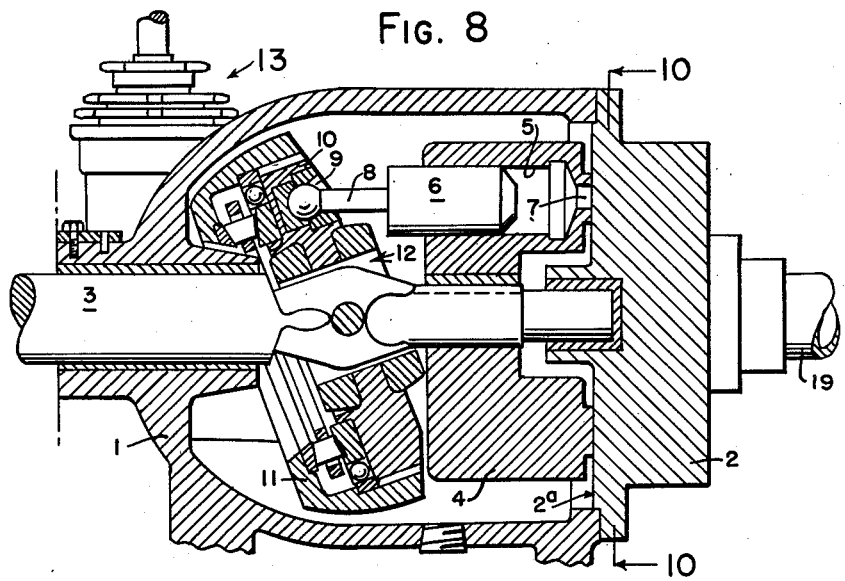
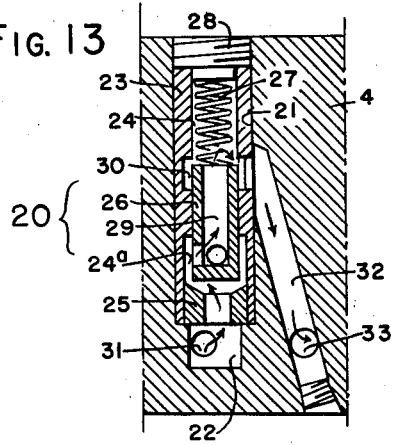
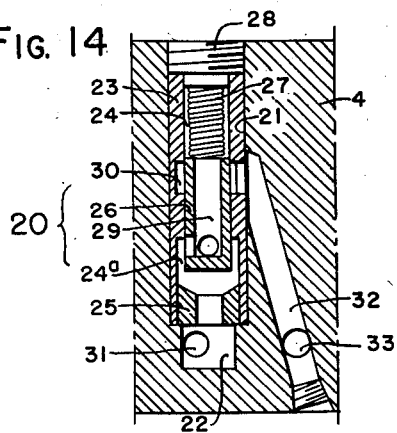
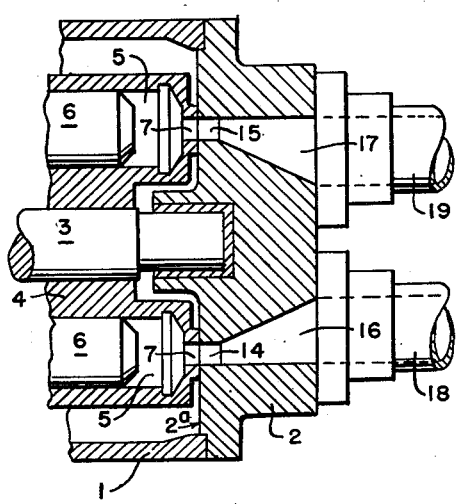
INVENTOR
Wesley P. Merrill Feb. 19, 1957　　　W. P. MERRILL　　　2,781,775
LIMITED CAPACITY CHECK VALVE
Filed Sept. 1, 1950　　　3 Sheets-Sheet 3
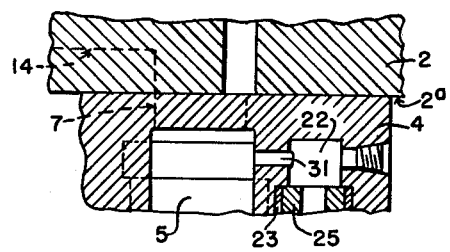
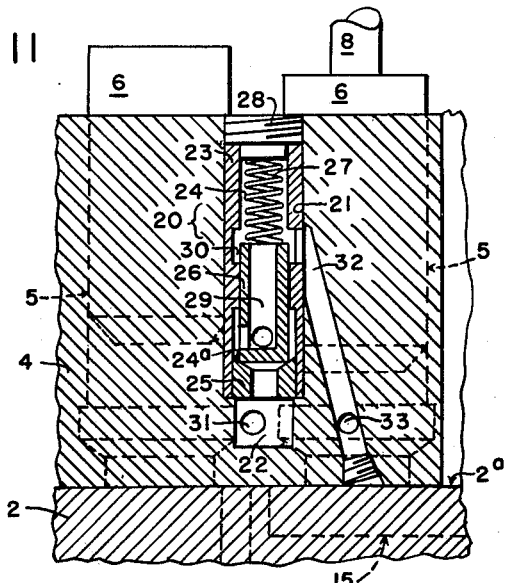
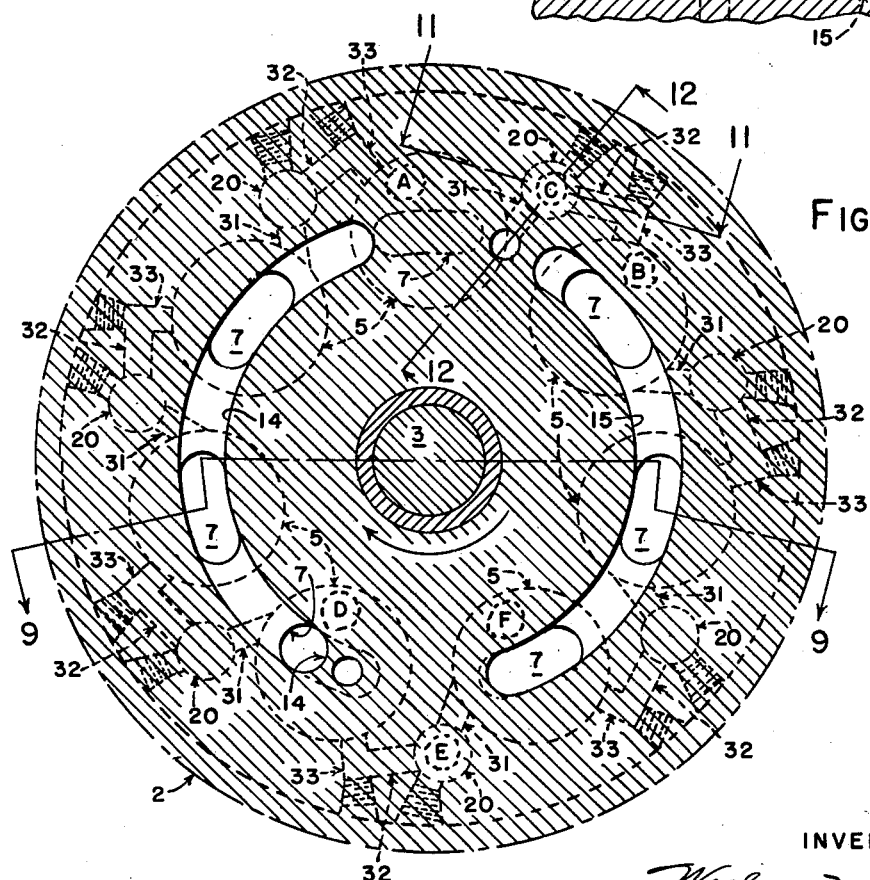
INVENTOR
Wesley P. Merrill United States Patent Office 2,781,775
Patented Feb. 19, 1957

2,781,775

LIMITED CAPACITY CHECK VALVE

Wesley P. Merrill, Wauwatosa, Wis., assignor to The Oilgear Company, Milwaukee, Wis., a corporation of Wisconsin Application September 1, 1950, Serial No. 182,683

11 Claims. (Cl. 137—498)

This invention relates to check valves which will permit liquid to flow therethrough from the inlet thereof to the outlet thereof but will prevent liquid from flowing therethrough in the opposite direction.

The object of the invention is to provide a check valve which will open and permit liquid to flow therethrough from the inlet thereof to the outlet thereof at a limited rate but will close and prevent flow of liquid therethrough in response to liquid being supplied to the inlet thereof at a rate in excess of a predetermined limited rate.

Limited capacity check valves are particularly adapted for use in rotary pumps of the expansible chamber type and the invention will be explained as being employed for that purpose but it is to be understood that check valves embodying the invention are not limited to such use.

A pump of this type includes at least one intake port for connection to a supply of liquid and at least one discharge port which is spaced from the intake port and is adapted to be connected to an external circuit, a plurality of pump chambers, means to cause each pump chamber to communicate with the intake port and the discharge port alternately and means to increase the capacity of each chamber while it is in communication with the intake port and decrease the capacity of each chamber while it is in communication with the discharge port to thereby cause liquid to flow from the intake port into each chamber in communication therewith and liquid to be expelled into the discharge port from each chamber in communication therewith.

When the liquid discharged by the pump is required to do useful work such as energizing a motor, the liquid expelled from the chambers into the discharge port causes pressure to rise therein but the liquid in the chambers which are not in registry with the discharge port is under a low or negative pressure and very often it contains entrained gas. Consequently, when a chamber opens to the discharge port, the pressure in the discharge port causes liquid to rush therefrom into the chamber and compress the liquid and entrained gas therein until the pressure in that chamber is the same as the pressure in the discharge port. This sudden back flow of liquid from the discharge port into the chamber causes a shock and a resultant noise and, if the pump is creating a high pressure, the shock and noise are of considerable magnitude.

In order to eliminate or greatly reduce the shocks and noise inherent in pumps of this type, the leading end of each port is spaced farther from the trailing end of the adjacent port than is customary, each chamber is connected through a check valve to the preceding chamber, each chamber after passing out of communication with the intake port starts to contract and it discharges liquid through a check valve until it opens to the discharge port as will presently be explained and as fully explained in application Serial No. 175,190 filed July 21, 1950, now Patent No. 2,661,695.

Shortly before each chamber passes out of communication with the discharge port, the preceding chamber opens to the intake port, thereby reducing the pressure at the outlet of the check valve connected to those two cylinders so that, if an ordinary check valve were employed, the pressure in the chamber still in communication with the discharge port would cause the check valve to open and permit liquid to flow therethrough from the discharge port into the intake port but, by employing a check valve embodying the present invention, flow of liquid from the discharge port to the intake port is prevented.

The invention is exemplified by the check valves shown somewhat diagrammatically in the accompanying drawings in which the views are as follows:

Fig. 8 is a longitudinal vertical section through a well known type of pump to which the invention may be applied.

Fig. 9 is an approximately horizontal section through the rear part of the pump shown in Fig. 8, the plane of the view being indicated by the irregular line 9—9 of Fig. 10.

Fig. 10 is a transverse section taken on the line 10—10 of Fig. 8 but drawn to a considerably larger scale.

Fig. 11 is a fragmentary sectional view taken on the line 11—11 of Fig. 10 and showing another form of the invention inserted into the rotor of the pump.

Fig. 12 is a fragmentary sectional view taken on the line 12—12 of Fig. 10.

Fig. 13 is a view similar to a part of Fig. 11 but showing the check valve open so that liquid may flow therethrough at a limited rate.

Fig. 14 is a view similar to Fig. 13 but showing the check valve closed in response to liquid being supplied to its inlet at a rate in excess of a predetermined limited rate.

Figure 1:
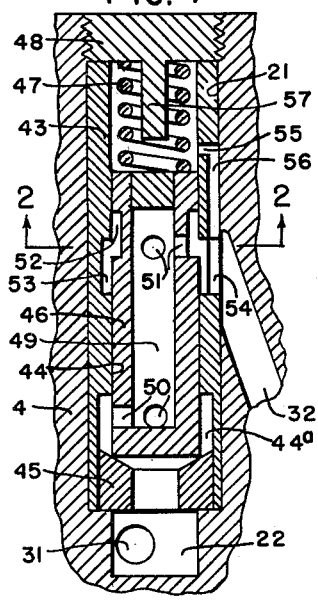
Fig. 1 is a central longitudinal section through a check valve embodying the invention, the valve member or plunger being shown in its normally closed position.

Before describing the check valves in which the invention is embodied, it will be advantageous to describe the pump shown in Figs. 8–10 because the valves illustrated in Figs. 1–4 have been shown as being inserted into the cylinder barrel of a pump.

*Figs. 8–14*

For the purpose of illustration, the invention has been shown as being applied to an ordinary swash plate type pump but it may be applied to other types of pumps and adapted to other uses. Since the pump shown in these figures is substantially the same as the pump shown in Patent No. 1,020,285 to which reference may be had for details of construction, only so much of the pump has been illustated as is necessary to an explanation of the invention.

The pump has its mechanism arranged within and carried by a casing 1 having its rear end closed by a removable end head 2 the front portion of which constitutes a valve 2ᵃ for controlling the flow of liquid to and from the pumping cylinders as will presently be explained. A drive shaft 3 journaled in the front wall of casing 1 and in end head 2 has fixed for rotation therewith a cylinder barrel 4 having seven equally spaced cylinders 5 formed therein parallel to the axis of shaft 3. Each cylinder 5 has a piston 6 fitted therein and it communicates at its inner end with a cylinder port 7 which extends through the rear end of cylinder barrel 4 and preferably is elongated in the direction of rotation as shown in Fig. 10.

Each piston 6 is connected by a ball and socket joint (not shown) to one end of a connecting rod 8 having the other end thereof connected by a ball and socket joint 9 to a thrust member 10 which is rotatably supported within a tilting box 11 and is fixed for rotation with shaft 3 by a universal joint 12 so that thrust member 10 and cylinder barrel 4 will rotate in unison.

Cylinder barrel 4 is adapted to be rotated only in a clockwise direction in respect to Fig. 10 as indicated by the arrow on that figure, and in order that the pump may be capable of discharging liquid in either of two opposite directions and at selected rates in each direction, box 11 is supported at opposite sides thereof upon two trunnions (not shown) which are fixed in opposite sides of casing 1, and it is adapted to be tilted upon those trunnions by a stroke changing mechanism 13.

The arrangement is such that, when thrust member 10 is vertical, the pump will be at zero stroke so that no liquid will be discharged thereby and, when thrust member 10 is tilted in one direction or the other, the pump will discharge liquid in a direction and at a rate determined by the direction and the degree that thrust member 10 is tilted from its vertical position.

The rear end of cylinder barrel 4 engages the front face of valve 2$^a$ on end head 2 and the contacting surfaces thereof are made flat and smooth. Two arcuate valve ports 14 and 15 (Figs. 9 and 10) are formed in the face of valve 2$^a$ and communicate, respectively, through two passages 16 and 17 (Fig. 9) with two pipes 18 and 19 which form parts of the two sides of a hydraulic circuit. Ports 14 and 15 are formed upon the same radius as cylinder ports 7 so that the cylinder ports will register successively with a valve port and each cylinder port will register with the two valve ports alternately during rotation of cylinder barrel 4. The front portion of end head 2 containing ports 14 and 15 thus constitutes a valve for controlling the flow of liquid to and from cylinders 5.

When thrust member 10 is inclined in the direction shown in Fig. 8 and cylinder barrel 4 is rotated in the direction indicated by the arrow shown in Fig. 10, thrust member 10 will pull the upward moving pistons outward and will force the downward moving pistons inward. The upward and outward moving pistons will draw the liquid into their cylinders from port 14 until they reach the dead-center position on the vertical centerline of the pump and the downward and inward moving pistons will eject liquid from their cylinders into port 15 until they reach the dead-center position on the vertical centerline of the pump. If thrust member 10 is then inclined in the opposite direction, the downward moving pistons will draw liquid into their cylinders from port 15 and the upward moving pistons will eject liquid from their cylinders into port 14. Each of ports 14 and 15 may thus function either as an intake port or as a discharge port.

The pump thus far described is substantially the same as the pump shown in Patent No. 1,020,285 but in the patented pump the valve ports are spaced apart a distance equal to or only slightly greater than the angular length of a cylinder port while in a pump embodying the invention the valve ports are spaced farther apart.

When a pump is performing useful work, it creates a high pressure in the discharge port and in the cylinders in communication therewith but the cylinders in communication with the intake port contain liquid under a low or negative pressure and each cylinder as it moves out of communication with the intake port may not be completely filled with liquid. If the valve ports are spaced apart a distance equal to or only slightly greater than the length of a cylinder port so that a cylinder port opens to the discharge port as soon as it moves out of communication with the intake port as is the case in the prior pumps, the high pressure in the discharge port will cause liquid to rush therefrom into the cylinder to fill any void and to compress the liquid and gas therein to the pressure prevailing in the discharge port, thereby causing a sudden shock and resultant noise.

In a pump to which the invention has been applied, a cylinder does not open to the discharge port until the piston in that cylinder has compressed the liquid and gas therein to a pressure which is approximately the same as the pressure in the discharge port. If the pressure in a cylinder as it moves out of communication with the inlet port were always the same, if the pump stroke were constant and if the cylinder were always completely filled with liquid, the valve ports could be spaced apart such a distance that at the time the cylinder opens to the discharge port the piston in that cylinder would have compressed the liquid therein to a pressure approximately the same as the pressure in the discharge port. However, the pressure and the volume of fluid in a cylinder at the instant that it moves out of communication with the intake port both vary widely under different operating conditions and the amount of air or gas therein is variable and unknown. Therefore, in order to compensate for such varying conditions, each cylinder which has just moved out of communication with the intake port is connected to the discharge port through a check valve which opens only after the pressure in the cylinder has been raised by the instroke of the piston until it is approximately the same as the pressure in the discharge port.

As shown, the upper end of port 14 and the lower end of port 15 are each spaced from the adjacent dead center position a distance equal to or only slightly greater than one-half of the length of a cylinder port 7 the same as in the prior pumps but the upper end of port 15 and the lower end of port 14 are spaced at such a distance from the adjacent dead center position that, when a cylinder moves from a dead center position toward the adjacent port, the piston in that cylinder will be forced inward far enough to compress the fluid in that cylinder to a pressure at least as high as the pressure in that port before the cylinder opens to that port, and each cylinder is connected through a check valve 20 to the cylinder immediately preceding it so that when the pressure in the cylinder passing from the intake port to the discharge port becomes high enough, liquid will flow through the check valve 20 and through the preceding cylinder into the discharge port.

A check valve 20 is arranged in cylinder barrel 4 between each two adjacent cylinders 5 and the several check valves are arranged in a circle which is larger than the cylinder port circle. Check valve 20 preferably is of the type shown in Figs. 1-4 but, since it would be difficult to illustrate that type of valve on such a small scale, check valve 20 has been shown as being of a less complicated type.

Each check valve 20 is arranged in a bore 21 which extends inward from the front end of cylinder barrel 4 and communicates at its inner end with an inlet chamber 22 which is concentric with and smaller in diameter than bore 21. The portion of cylinder barrel 4 immediately surrounding bore 21 may constitute the body structure of the valve but, preferably, the body structure of each valve includes a tubular sleeve 23 which is closely fitted in bore 21. Sleeve 23 has an axial bore 24 the inner portion of which is enlarged to form a counterbore 24$^a$ having closely fitted therein an annular valve seat 25 the opening through which provides communication between inlet chamber 22 and counterbore 24$^a$ when the check valve is open.

Valve seat 25 is normally engaged by one end of a valve member or plunger 26 which is slidably fitted in bore 24 and is urged toward seat 25 by a weak spring 27 arranged between its other end and a plug 28 which closes the outer end of bore 21 and holds sleeve 23 and valve seat 25 against the shoulder formed at the junction of bore 21 and chamber 22.

When the check valves are arranged with the axes thereof parallel to the rotor axis as shown, the valve member of each check valve must be urged toward its seat by a spring which preferably has only enough strength to positively move the valve member against its seat. In some types of pumps however, the springs may be dispensed with and the check valves be arranged radially so that the valve members thereof are urged toward the valve seats by centrifugal force.

Plunger 26 has an internal passage 29 which extends axially inward from the outer end thereof and then extends radially through the side wall of the plunger at a point spaced from the inner end thereof. Passage 29 provides communication between counterbore 24$^a$ and an annular groove or port 30 which is formed in the inner wall of sleeve 23 and so located that it will be closed by plunger 26 if plunger 26 lifts a predetermined distance from seat 25.

The check valve needs to have only sufficient capacity to pass the small volume of liquid that is ejected from a cylinder while that cylinder is moving from its upper dead center position to the position in which its port 7 opens to valve port 15. For example, plunger 26 may need to lift only $\frac{1}{32}''$ from seat 25 to pass the greatest volume of liquid that will be ejected from a cylinder through the check valve in which case plunger 26 is of such length that its upper end is spaced $\frac{1}{32}''$ from the upper edge of port 30 when its lower end is spaced $\frac{1}{32}''$ from seat 25.

The arrangement is such that, when the pressure in inlet chamber 22 exceeds the pressure in port 30 by an amount determined by the resistance of spring 27, plunger 26 will be lifted a short distance from seat 25 and will permit liquid to flow from inlet chamber 22 through valve seat 25, counterbore 24$^a$ and passage 29 into port 30 at any rate within the limited capacity of the valve but, if liquid tries to flow through the valve at a rate in excess of the capacity thereof, plunger 26 will be lifted farther from its seat 25 and will close port 30, as shown in Fig. 14, and thereby prevent flow of liquid through the valve. The inner end portion of plunger 26 thus constitutes a valve to control the inlet of the check valve and the other end portion of plunger 26 constitutes a valve to control the outlet of the check valve.

The chamber 22 of each valve 20 communicates with a passage 31 the end of which constitutes the inlet port of the valve. Each check valve 20 has its inlet port connected to the discharge end of a cylinder 5 and its outlet port connected to a passage which communicates with a valve port when that cylinder 5 moves out of communication with the other valve port. As shown, the discharge end of each cylinder 5 is connected through a passage 31 (Figs. 10–12) with the inlet chamber 22 of the check valve 20 which immediately precedes that cylinder 5 in respect to the direction of rotation of cylinder barrel 4, and the port 30 of that check valve 20 is connected through a passage 32 and a passage 33 to the discharge end of the cylinder 5 which immediately precedes that check valve 20 in respect to the direction of rotation of cylinder barrel 4. Each cylinder 5 is thus connected to the two adjacent check valves 20 and each check valve 20 is connected to the two adjacent cylinders 5.

When cylinder barrel 4 is rotated in the direction of the arrow on Fig. 10 and the pump is discharging liquid under pressure through valve port 15, the cylinder 5 at the upper dead center position (which has been designated as cylinder A in Fig. 10) will contain liquid at a low or negative pressure and the next preceding cylinder (which has been designated as cylinder B in Fig. 10) will contain liquid at a high pressure. The pressure in cylinder B will extend therefrom through passages 33 and 32 and port 30 into the upper part of the sleeve 23 of the adjacent check valve 20 (which has been designated in Fig. 10 as valve C) and will assist spring 27 in holding the plunger 26 of valve C against seat 25.

As cylinder A moves in the direction of the arrow, the piston 6 in cylinder A will be forced inward by thrust member 10 and will compress the liquid in cylinder A until it creates therein a pressure which exceeds the pressure in discharge port 15 by an amount slightly in excess of the force exerted by light spring 27 and which extends through passage 31 and valve seat 25 and acts upon the inner end of plunger 26 of valve C. Then the pressure acting upon plunger 26 will raise it from seat 25, as shown in Fig. 13, and the inward moving piston will expel liquid from cylinder A through passage 31, check valve C and passages 32 and 33 and cylinder B into discharge port 15 until cylinder A opens to port 15. Since the pressure in cylinder A is approximately the same as the pressure in discharge port 15, there is no sudden compression of the liquid in cylinder A and, consequently, no resultant shock and noise such as occurs in the prior pumps.

As soon as cylinder A opens to port 15, the piston in cylinder A can eject liquid therefrom through its port 7 directly into port 15 and the pressure at the inlet of check valve C becomes the same as the pressure at the outlet thereof, thereby permitting valve C to be closed by its spring 27. Each of check valves 20 will function in the above described manner as the cylinder 5 associated therewith passes from the intake port to the discharge port.

After each cylinder 5 has passed a short distance beyond lower dead center position as indicated by the cylinder which has been designated as cylinder D in Fig. 10, its port 7 opens to intake port 14 and thereby reduces the pressure at the outlet of the following check valve 20 which has been designated in Fig. 10 as valve E. At that time, the following cylinder 5, which has been designated in Fig. 10 as cylinder F, is still open to discharge port 15 so that the inlet of valve E is subjected to the discharge pressure.

Dropping the pressure in cylinder D permits the high pressure in cylinder F to raise the plunger 26 of check valve E from its seat. If the check valve were of the ordinary type which opens and remains open in response to a predetermined drop in pressure thereacross, liquid could flow therethrough from discharge port 15 into intake port 14 until the port 7 of cylinder F moved out of registry with port 15 and this would occur each time a cylinder passed across dead center. Each check valve 20 has ample capacity to pass the relatively small volume of liquid which is ejected from a cylinder 5 as that cylinder passes from its upper dead center position to the position in which its port 7 opens to discharge port 15 but it is obvious that all of the liquid discharged by the pump into port 15 at any given instant could not flow through check valve 20. Consequently, when the port 7 of cylinder D opens to intake port 14, the pressure therein is suddenly reduced to a low or negative value and the large volume of high pressure liquid in discharge port 15 tries to flow through check valve E but, since it cannot do so, it raises the plunger 26 of valve E high enough to cause it to block port 30, as shown in Fig. 14, thereby preventing flow of liquid from port 15 to port 14.

As soon as cylinder F opens to port 14, the pressures at opposite ends of check valve E are equalized and valve E is closed by its spring 27. All of the check valves 20 function in the same manner as the cylinders associated therewith pass across lower dead center.

When the pump is operating normally, the portion of bore 24 containing spring 27 will be filled with liquid which will stop further movement of plunger 26 immediately after it has closed port 30. Under certain temporary conditions however, the spring portion of bore 24 may contain some air or gas which might permit plunger 26 to be moved too far from seat 25 whereupon spring 27 might not be able to return it against seat 25 before the cylinder associated with that check valve reached upper dead center. Therefore, the movement of plunger 26 away from valve seat 25 is limited by a suitable stop. For example, spring 27 may be so designed that it goes solid and prevents further movement of plunger 26, as shown in Fig. 14, as soon as the upper end of plunger 26 passes the upper edge of port 30.

When thrust member 10 is tilted in a direction opposite to that shown in Fig. 8, the pump will discharge liquid in the opposite direction, port 14 will be the discharge port and port 15 will be the intake port but check valves 20 will function in the above described manner. That is, the check valves will permit liquid to flow therethrough from the cylinders into the discharge port as the cylinders pass from the intake port to the discharge port and they will prevent flow of liquid from the discharge port into the intake port as the cylinders pass from the discharge port to the intake port.

Figs. 1–4

Pumps employed for the hydraulic transmission of power are ordinarily driven at high speeds and the check valve shown in Figs. 11–14 will operate satisfactorily in high speed pumps but it might not be entirely satisfactory if the pump in which it was incorporated should be driven at too slow a speed. Therefore, a pump preferably is provided with the check valve shown in Figs. 1–4 if there is room in the cylinder barrel for it but, as previously stated, it was not shown in Figs. 11–14 because it could not be properly illustrated on such a small scale.

For the purpose of illustration, let it be assumed that the check valve shown in Figs. 1–4 is arranged in each of the bores 21 in cylinder barrel 4 of the pump shown in Figs. 8–12, only a fragment of cylinder barrel 4 being shown in each of Figs. 1–4. As previously explained, each bore 21 communicates intermediate its ends with a passage 32 and it communicates at its inner end with an inlet chamber 22 which communicates with a passage 31 the end of which constitutes the inlet port of the valve.

The portion of cylinder barrel 4 immediately surrounding bore 21 may constitute the body structure of the valve but, preferably, the body structure of each valve includes a tubular sleeve 43 which is closely fitted in bore 21. Sleeve 43 has an axial bore 44 the inner portion of which is enlarged to form a counterbore 44ª having closely fitted therein an annular valve seat 45 the opening through which provides communication between inlet chamber 22 and counterbore 44ª when the check valve is open.

Valve seat 45 is normally engaged by one end of a valve member or plunger 46 which is slidably fitted in bore 44 and is urged toward seat 45 by a weak spring 47 arranged between its other end and a plug 48 which closes the outer end of bore 21 and holds sleeve 43 and valve seat 45 against the shoulder formed at the junction of bore 21 and chamber 22.

Plunger 46 has formed therein an internal axial passage 49 and a plurality of passages 50 which extend from one end of passage 49 radially outward into communication with counterbore 44ª in a plane spaced from the inner end of plunger 46. The other end of passage 49 communicates through a plurality of radial passages 51 with an annular groove 52 which is formed in the outer peripheral surface of plunger 46 and normally registers with an annular groove 53 which is formed in the wall of bore 44 and communicates with passage 32 through a port 54 formed in sleeve 43. In order that plunger 46 may be subjected to the pressure at the outlet of the check valve, a small hole 55 is formed in the wall of sleeve 43 and connected to port 54 by a small axial groove 56 formed in the outer peripheral surface of sleeve 43.

Figure 4:
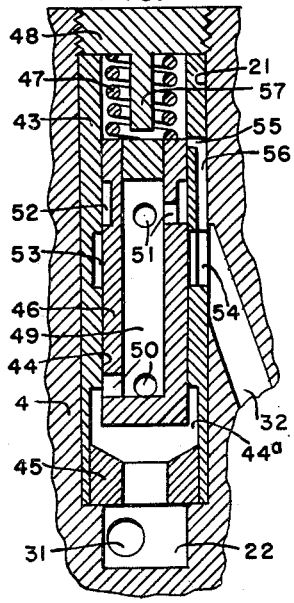
Fig. 4 is a view similar to Fig. 1 but showing the valve closed in response to liquid being supplied to its inlet at a rate in excess of a predetermined limited rate.
Figure 2:
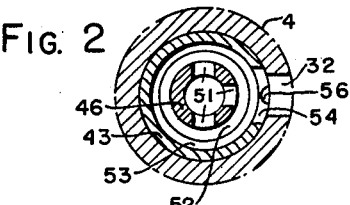
Fig. 2 is a transverse section taken on the line 2—2 of Fig. 1.

Grooves 52 and 53 are so located in respect to each other that groove 52 will move out of communication with groove 53, as shown in Fig. 4, when plunger 46 is moved away from seat 45 farther than is necessary to permit liquid to flow through the check valve at a predetermined limited rate. For example, if liquid can flow through the check valve at the desired limited rate when plunger 46 is lifted 1/32" from seat 45, the lower edge of groove 52 is spaced from the upper edge of groove 53 slightly more than 1/16" when plunger 46 is in contact with seat 45 so that plunger 46 has to move only a little more than 1/16" to block communication between the inlet and the outlet of the valve. Hole 55 is so located that the end of plunger 46 aligns with the upper edge of hole 55 when the lower edge of groove 52 is just above the upper edge of groove 53 as shown in Fig. 4. The inner end portion of plunger 46 thus constitutes a valve for controlling the inlet and the portion of plunger 46 adjacent to the other end thereof constitutes a valve for controlling the outlet.

The arrangement is such that, when plunger 46 is in the position shown in Fig. 1, any pressure in passage 32 extends through port 54, groove 56 and hole 55 into the spring end of bore 44 and assists spring 47 in holding plunger 46 against seat 45.

Figure 3:
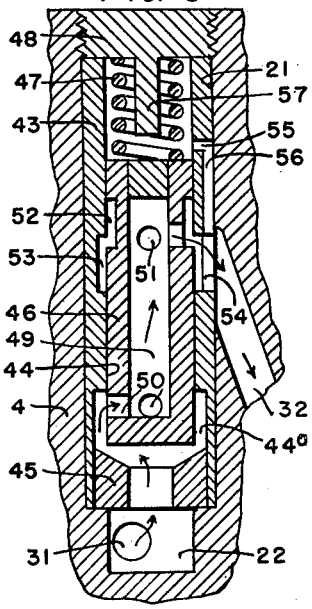
Fig. 3 is a view similar to Fig. 1 but showing the valve open so that liquid may flow therethrough at a limited rate.

When liquid is supplied to the inlet of the check valve at a rate not in excess of the limited capacity of the valve and at a pressure which exceeds the pressure in outlet port 54 by an amount sufficient to overcome the resistance of spring 47, plunger 46 will be raised a short distance from its seat 45, as shown in Fig. 3, and liquid will flow from the inlet through valve seat 45, counterbore 44ª, passage 50, 49 and 51, grooves 52 and 53 and outlet port 54 into passage 32.

When liquid is supplied to the inlet of the valve at a rate in excess of the limited capacity of the valve and at a pressure which exceeds the pressure in outlet port 54 by an amount sufficient to overcome the resistance of spring 47, the liquid will almost instantly move plunger 46 to the position shown in Fig. 4 in which position outlet port 54 is blocked so that no liquid can flow through the valve. As plunger 46 moves away from seat 45, it ejects liquid from the spring end of bore 44 through hole 55 and groove 56 into outlet port 54. Just after plunger 46 moves beyond the position shown in Fig. 3, it starts to cover the end of hole 55 and thereby throttle the flow of liquid from the spring end of bore 44 so that plunger 46 is decelerated. Just after groove 52 moves out of communication with groove 53 to block port 54, plunger 46 completely covers the end of hole 55 and the liquid thus trapped in the spring end of bore 44 stops further movement of plunger 46. Since under certain conditions the spring end of bore 44 may also contain some air or gas, plug 48 is provided with a stop 57 of such a length that it will positively stop plunger 46 if plunger 46 should move a short distance after closing the end of hole 55.

When the check valve is installed in a pump, it will function in the above described manner and in substantially the same manner as the check valve shown in Figs. 11–14. That is, when it is in the position indicated at "C" in Fig. 10, pressure extends from cylinder B through passages 33 and 32, port 54, groove 56 and hole 55 into the spring end of bore 44 and holds plunger 46 against valve seat 45. As cylinder A moves in the direction of the arrow, the piston therein is forced inward and creates in cylinder A a pressure somewhat higher than the pressure in cylinder B. Then the check valve opens and liquid flows therethrough from cylinder A into cylinder B until the port 7 of cylinder A opens to valve port 15 at which time both ends of plunger 46 are subjected to the same pressure and spring 47 moves plunger 46 against seat 45.

When the cylinder to which the outlet of the check valve is connected opens to intake port 14 as indicated by cylinder D in Fig. 10, the cylinder to which the inlet of the check valve is connected is still open to the discharge port 15 as indicated by cylinder F in Fig. 10. The instant that cylinder D opens to port 14, the pressure in the spring end of bore 44 drops to a low or negative value and the high pressure liquid in discharge port 15 rushes into the inlet of the check valve at a high rate and moves its plunger 46 to the position shown in Fig. 4 so that no liquid can flow from port 15 into port 14.

Figure 5:
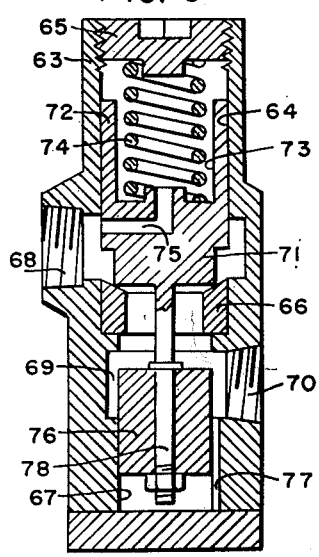
Fig. 5 is a central longitudinal section through another form of the invention.
Figure 6:
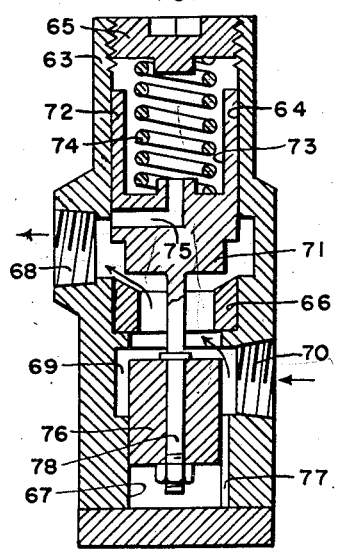
Fig. 6 is a view similar to Fig. 5 but showing the valve open so that liquid may flow therethrough at a limited rate.
Figure 7:
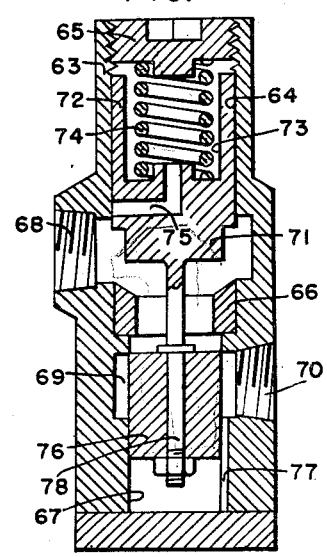
Fig. 7 is a view similar to Fig. 5 showing the valve closed in response to liquid being supplied to its inlet at a rate in excess of a predetermined limited rate.

*Figs. 5–7*

The check valve shown in these figures differs primarily from the valves shown in Figs. 1–4 and Figs. 11–14 in that its inlet instead of its outlet is closed in response to liquid being supplied to its inlet at a rate in excess of the capacity of the valve.

For the purpose of illustration, the check valve has been shown as being provided with a body or casing 63 but the valve mechanism may be inserted in a bore formed in the cylinder barrel of a pump or body 63 may be a sleeve adapted to be inserted in a bore in the cylinder barrel of a pump similarly to the sleeves of the check valves previously described.

As shown, body 63 has an axial bore 64 formed in the upper part thereof and closed at its upper end by a plug 65, an annular valve seat 66 fitted in the lower end of bore 64, an axial bore 67 formed in the lower part thereof and communicating with bore 64 through the opening in seat 66, an outlet port 68 communicating with bore 64 at a point above seat 66, an annular inlet port 69 formed in the wall of bore 67 and an inlet 70 communicating with port 69.

Valve seat 66 is normally engaged by a valve 71 carried by a plunger 72 the upper part of which is slidably fitted in bore 64 and provided with an axial recess 73. Valve 71 is urged toward seat 66 by a spring 74 arranged within recess 73 between the bottom thereof and plug 65.

In order that liquid may flow out of or into the upper part of bore 64 when valve 71 moves away from or toward valve seat 66 and in order that valve 71 may be urged toward seat 66 by any pressure prevailing in outlet 68, a passage 75 is extended downward from recess 73 and then extended radially outward at a point spaced such a distance above the lower end of plunger 72 that the end of passage 75 will be covered by the wall of bore 64 when valve 71 is moved a predetermined distance away from seat 66.

Plunger 72 also includes a second valve 76 which is closely fitted in bore 67 and has its lower end subjected to the inlet pressure through an axial groove 77 which is formed in the wall of bore 67 and extends downward from port 69 to a point below which valve 76 does not move. Due to valves 75 and 76 being arranged at opposite sides of valve seat 66, valve 76 is made separately from valve 75 and is rigidly secured thereto by a rod 78 which holds valve 76 at such a distance from valve 75 that it will block port 69 when the end of passage 75 is blocked by the wall of bore 64.

The arrangement is such that, when valve 71 is in contact with valve seat 66 as shown in Fig. 5, any pressure in outlet 68 extends through passage 75 and assists spring 74 in holding valve 71 against seat 66, and any pressure in inlet 70 extends through port 69 and groove 77 into the lower end of bore 67 and urges plunger 72 upward.

When liquid is supplied to inlet 70 at a rate not in excess of the limited capacity of the check valve and at a pressure which exceeds the pressure in outlet 68 by an amount sufficient to overcome the resistance of spring 74, liquid will flow from inlet 70 through port 69 and groove 77 into the lower end of bore 67 and cause plunger 72 to move upward until valve 71 is far enough from valve seat 66 to permit all of the liquid delivered to inlet 70 to flow therefrom through port 69, the upper part of bore 67, valve seat 66 and the opening between valve 71 and valve seat 66 into outlet 68. If liquid is supplied to inlet 70 at the full capacity of the check valve, the opening between the upper corner of valve 76 and upper edge of port 69 will be substantially the same as the opening between the face of valve seat 66 and the lower corner of valve 71 as indicated in Fig. 6.

When liquid is supplied to inlet 70 at a rate in excess of the capacity of the check valve and at a pressure which exceeds the pressure in outlet 68 by an amount sufficient to overcome the resistance of spring 74, all of the liquid supplied to inlet 70 can not flow through the restricted opening between valve 71 and valve seat 66. Consequently, liquid will continue to flow from port 69 through groove 77 into the lower end of bore 67 and to move plunger 72 upward until valve 76 blocks port 69, as shown in Fig. 7, and thereby prevents any liquid from flowing through the check valve.

Plunger 72 will move upward at high speed and will eject liquid from the upper part of bore 64 through passage 75 into outlet 68, but as soon as valve 71 passes the position shown in Fig. 6, the wall of bore 64 starts to cover the end of passage 75 and thereby throttle the flow of liquid from the upper end of bore 64 so that plunger 72 is decelerated. When valve 76 completely blocks port 69, the wall of bore 64 completely blocks the end of passage 75 and the liquid thus trapped in the upper part of bore 64 stops further movement of the plunger. If the upper part of the bore 64 should contain some air or gas, plunger 72 could move farther, but if the fluid entrapped in the upper part bore 64 is unable to stop the upward movement of the plunger, the upward movement would be positively stopped by engagement of the upper end of plunger 72 with plug 65.

The invention herein set forth may be embodied in other forms and be adapted to various uses without departing from the scope of the invention which is hereby claimed as follows.

I claim:

1. A limited capacity check valve comprising a body structure having a bore, an inlet at one end of said bore, a chamber at the other end of said bore and an outlet spaced from said inlet and normally communicating with said chamber, a valve seat arranged in said bore between said inlet and said outlet and having an opening extending therethrough from said bore into communication with said inlet, a valve arranged in said structure and baised to a first position in which it engages said valve seat to block communication between said inlet and said outlet, said valve also being urged toward said first position by any pressure in said outlet and being urged away from said first position by the pressure in said inlet so that it will be moved from said first position and open said inlet in response to the pressure in said inlet exceeding the pressure in said outlet by a predetermined amount and said valve will be moved only a short distance to a second position if liquid is supplied to said inlet at a rate not in excess of a predetermined limited rate but said valve will be moved farther from said first position to a third position if liquid is supplied to said inlet at a rate in excess of said limited rate, a plunger fixed to said valve and provided with a passage through which liquid may flow from said inlet to said outlet when said valve is in said second position, and a second valve carried by said plunger and so located that it will block said outlet from said inlet and from said chamber and will extend into said chamber in response to said first valve moving into said third position and the liquid in said chamber will arrest further movement of said plunger.

2. A limited capacity check valve according to claim 1 including other means for preventing said first valve from being moved beyond said third position.

3. A limited capacity check valve comprising a body structure having a bore and a counterbore at one end of said bore, a valve seat fixed in said counterbore and having an opening therethrough for connecting said counterbore to a source of pressure fluid, a valve plunger fitted in said bore and having a passage formed therein and communicating at one end thereof with said counterbore, a spring arranged in the other end of said bore and normally holding said plunger in a first position in which one end thereof engages said valve seat to block the opening therethrough, and an outlet port arranged in the wall of said bore intermediate the ends thereof and normally communicating with the other end of said passage and with the spring end of said bore so that said plunger is urged toward said seat by said spring and by any pressure in the spring end of said bore and is movable away from said seat in response to the pressure in said valve seat opening exceeding the pressure in the spring end of said bore by a predetermined amount, said outlet port being so located that movement of said plunger away from said seat through a limited distance to a second position will permit fluid to flow from said valve seat opening through said counterbore and said passage to said outlet port and movement of said plunger through a greater distance to a third position will cause the other end portion of said plunger to block said outlet port.

4. A limited capacity check valve according to claim 3 in which said outlet port communicates with the spring end of said bore in such a manner that said plunger in moving into said third position blocks communication between said port and the spring end of said bore to trap fluid in said spring end so that the liquid trapped therein will act as a cushion to arrest further movement of said plunger.

5. A limited capacity check valve comprising a body structure having an axial bore, an annular valve seat arranged in said bore intermediate the ends thereof, a valve plunger arranged in said bore and forming with the walls thereof a pressure chamber at one end of said bore and a spring chamber at the other end of said bore, said body structure having an inlet port which communicates with said bore at one side of said valve seat and with said pressure chamber and an outlet port which communicates with said bore at the other side of said valve seat and with said spring chamber so that said plunger has one of its ends subjected to any pressure in said inlet port and its other end subjected to any pressure in said outlet port, a first valve carried by said plunger and adapted to engage said seat and block communication between said ports when said plunger is in a first position, a second valve carried by said plunger and so located that it will block one of said ports in response to said plunger being moved away from said first position more than a predetermined limited distance, and a spring arranged in said spring chamber for urging said plunger toward and normally holding it in said first position so that said first valve will engage said seat and block communication between said ports until the pressure in said inlet port exceeds the pressure in said outlet port by a predetermined amount which either will cause said plunger in response to liquid being supplied to said inlet port at a rate not in excess of a predetermined limited rate to move into a second position in which said first valve is moved far enough from said seat to permit liquid to flow from said inlet port to said outlet port as fast as it is supplied to said inlet port, or will cause said plunger in response to liquid being supplied to said inlet port at a rate in excess of said limited rate to move farther into a third position in which said second valve blocks said one port.

6. A limited capacity check valve comprising a body structure having a bore, an inlet at one end of said bore, a chamber at the other end of said bore and an outlet spaced from said inlet and normally communicating with said chamber, a valve seat arranged in said bore between said inlet and said outlet and having an opening extending therethrough from said bore into communication with said inlet, a valve arranged in said structure and biased to a first position in which it engages said valve seat to block communication between said inlet and said outlet, said valve also being urged toward said first position by any pressure in said outlet and being urged away from said first position by the pressure in said inlet so that it will be moved from said first position and open said inlet in response to the pressure in said inlet exceeding the pressure in said outlet by a predetermined amount and said valve will be moved only a short distance to a second position if liquid is supplied to said inlet at a rate not in excess of a predetermined limited rate but said valve will be moved farther from said first position to a third position if liquid is supplied to said inlet at a rate in excess of said limited rate, a plunger fixed to said valve and provided with a passage through which liquid may flow from said inlet to said outlet when said valve is in said second position, and a second valve carried by said plunger and so located that it will leave said outlet open or partly open when said first valve is in said first or second positions and will block said outlet in response to said first valve moving into said third position.

7. A limited capacity check valve according to claim 6 in which said passage is so located that it is progressively blocked during movement of said first valve from said second position to said third position and is completely blocked at substantially the same time that said first valve reaches said third position.

8. A limited capacity check valve according to claim 7 in which said second valve blocks said outlet in response to said first valve reaching said third position.

9. A limited capacity check valve according to claim 6 in which said second valve blocks said outlet in response to said first valve reaching said third position.

10. A limited capacity check valve comprising a body structure having an axial bore, a valve plunger arranged in said bore and forming with the walls thereof a pressure chamber at one end of said bore and a spring chamber at the other end of said bore, said body structure having an inlet port which communicates with said bore and with said pressure chamber and an outlet port which is spaced from said inlet port and communicates with said bore and with said spring chamber so that said plunger has one of its ends subjected to any pressure in said inlet port and its other end subjected to any pressure in said outlet port, a first valve carried by said plunger and adapted to block communication between said ports when said plunger is in a first position, a second valve carried by said plunger and so located that it will block one of said ports in response to said plunger being moved away from said first position more than a predetermined limited distance, and a spring arranged in said spring chamber for urging said plunger toward and normally holding it in said first position so that said first valve will block communication between said ports until the pressure in said inlet port exceeds the pressure in said outlet port by a predetermined amount which either will cause said plunger in response to liquid being supplied to said inlet port at a rate not in excess of a predetermined limited rate to move into a second position in which said first valve is moved far enough from its initial position to permit liquid to flow from said inlet port to said outlet port as fast as it is supplied to said inlet port, or will cause said plunger in response to liquid being supplied to said inlet port at a rate in excess of said limited rate to move farther into a third position in which said second valve blocks said one port and said plunger blocks communication between said spring chamber and said outlet.

11. A limited capacity check valve comprising a body structure having an axial bore, an annular valve seat arranged in said bore intermediate the ends thereof, a valve plunger arranged in said bore and forming with the walls thereof a pressure chamber at one end of said bore and a spring chamber at the other end of said bore, said body structure having an inlet port which communicates with said bore at one side of said valve seat and with said pressure chamber and an outlet port which communicates with said bore at the other side of said valve seat and with said spring chamber so that said plunger has one of its ends subjected to any pressure in said inlet port and its other end subjected to any pressure in said outlet port, a first valve carried by said plunger and adapted to engage said seat and block communication between said ports when said plunger is in a first position, a second valve carried by said plunger and so located that it will block one of said ports in response to said plunger being moved away from said first position more than a predetermined limited distance, and a spring arranged in said spring chamber for urging said plunger toward and normally holding it in said first position so that said first valve will engage said seat and block communication between said ports until the pressure in said inlet port exceeds the pressure in said outlet port by a predetermined amount which either will cause said plunger in response to liquid being supplied to said inlet port at a rate not in excess of a predetermined limited rate to move into a second position in which said first valve is moved far enough from said seat to permit liquid to flow from said inlet port to said outlet port as fast as it is supplied to said inlet port, or will cause said plunger in response to liquid being supplied to said inlet port at a rate in excess of said limited rate to move farther into a third position in which said second valve blocks said one port and in which said plunger blocks communication between said spring chamber and said outlet.

References Cited in the file of this patent

UNITED STATES PATENTS

| | | |
|---|---|---|
| 1,318,101 | Neesham | Oct. 7, 1919 |
| 2,286,027 | Towers | June 9, 1942 |
| 2,497,032 | Millard | Feb. 7, 1950 |

FOREIGN PATENTS

| | | |
|---|---|---|
| 34,017 | Norway | Jan. 1922 |